US010059295B2

(12) United States Patent
Sudo

(10) Patent No.: US 10,059,295 B2
(45) Date of Patent: Aug. 28, 2018

(54) STRUCTURE FOR ABSORBING IMPACT NEAR SEAT BELT ANCHOR BOLT

(71) Applicant: KASAI KOGYO CO., LTD., Kanagawa (JP)

(72) Inventor: Masahiro Sudo, Kanagawa (JP)

(73) Assignee: KASAI KOGYO CO., LTD., Koza-gun, Kanagawa (JP)

(*) Notice: Subject to any disclaimer, the term of this patent is extended or adjusted under 35 U.S.C. 154(b) by 24 days.

(21) Appl. No.: 15/506,182

(22) PCT Filed: Mar. 31, 2015

(86) PCT No.: PCT/JP2015/060063
§ 371 (c)(1),
(2) Date: Feb. 23, 2017

(87) PCT Pub. No.: WO2016/031287
PCT Pub. Date: Mar. 3, 2016

(65) Prior Publication Data
US 2017/0253209 A1   Sep. 7, 2017

(30) Foreign Application Priority Data
Aug. 28, 2014 (JP) .................................. 2014-173599

(51) Int. Cl.
*B60R 21/04* (2006.01)
*B60R 21/055* (2006.01)
*B60R 22/18* (2006.01)

(52) U.S. Cl.
CPC ............ *B60R 21/055* (2013.01); *B60R 21/04* (2013.01); *B60R 22/18* (2013.01)

(58) Field of Classification Search
CPC ........ B60R 21/055; B60R 21/04; B60R 22/18
See application file for complete search history.

(56) References Cited

U.S. PATENT DOCUMENTS 5,641,195 A * 6/1997 Patel ..................... B60R 13/025
280/751
5,779,270 A   7/1998 Tanaka
(Continued)

FOREIGN PATENT DOCUMENTS

EP   0763449 A1   3/1997
EP   0965495 A2   12/1999
(Continued)

OTHER PUBLICATIONS

International Search Report for International Application No. PCT/JP2015/060063 dated May 19, 2015, Japan.

*Primary Examiner* — Drew J Brown
(74) *Attorney, Agent, or Firm* — United IP Counselors, LLC

(57) ABSTRACT

An impact absorbing structure absorbs an impact applied from outside or inside of a vehicle near a seat belt anchor bolt that protrudes from the vehicle body panel toward the inside of the vehicle. The impact absorbing structure includes a cylinder body that accommodates a head part of the seat belt anchor bolt; an impact absorbing box arranged adjacently to the cylinder body, the impact absorbing box including a top plate facing the vehicle body panel; a base that supports the impact absorbing box; an attaching unit that attaches the base to a back face of the vehicle interior component; a stepped portion arranged on a side face of the impact absorbing box as a base point of crush deformation of the impact absorbing box; and a rib arranged between the impact absorbing box and the cylinder body to prevent escape of the impact absorbing box due to tilting thereof.

16 Claims, 3 Drawing Sheets

(56) References Cited

U.S. PATENT DOCUMENTS

| | | | | |
|---|---|---|---|---|
| 5,791,687 | A * | 8/1998 | Gotou | B60R 22/201 |
| | | | | 280/805 |
| 5,833,303 | A * | 11/1998 | Kawai | B60R 13/0206 |
| | | | | 296/187.05 |
| 6,007,100 | A * | 12/1999 | Steffens, Jr. | B60R 22/24 |
| | | | | 280/751 |
| 6,050,631 | A * | 4/2000 | Suzuki | B60R 13/0206 |
| | | | | 280/751 |
| 6,244,626 | B1 | 6/2001 | Monaghan | |
| 6,302,477 | B1 * | 10/2001 | Satou | B60R 13/0206 |
| | | | | 280/751 |
| 6,454,305 | B1 * | 9/2002 | Prottengeier | B60R 21/04 |
| | | | | 280/751 |
| 6,733,064 | B2 * | 5/2004 | Fox | B60R 21/04 |
| | | | | 280/751 |
| 6,749,224 | B1 * | 6/2004 | Stojanovski | B60R 21/055 |
| | | | | 280/801.1 |
| 6,832,800 | B2 * | 12/2004 | Hwang | B60R 13/0206 |
| | | | | 296/187.05 |
| 2005/0181178 | A1 * | 8/2005 | Murayama | B60R 21/04 |
| | | | | 428/167 |
| 2009/0289470 | A1 | 11/2009 | Dix | |

FOREIGN PATENT DOCUMENTS

| | | |
|---|---|---|
| FR | 2910410 A1 | 6/2008 |
| JP | 09-076875 A | 3/1997 |
| JP | 2002-029257 A | 1/2002 |
| JP | 2009-220713 A | 10/2009 |
| KR | 10-0374620 B1 | 6/2003 |

* cited by examiner

FIG. 2A
FIG. 2B
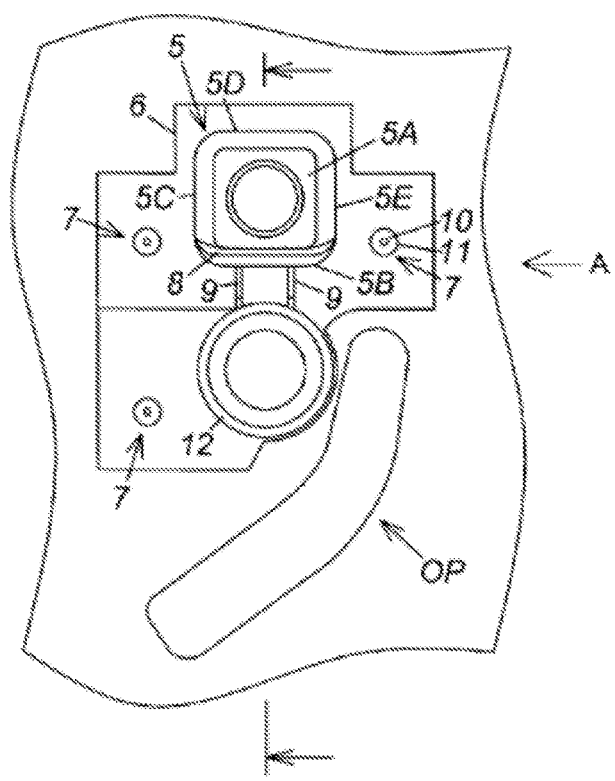
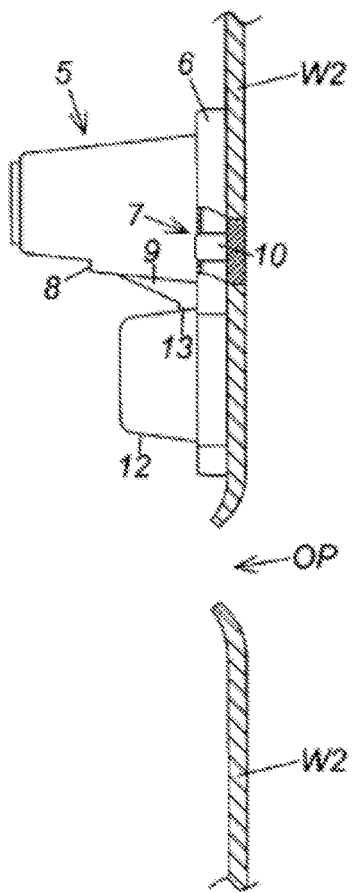

FIG. 3A
FIG. 3B
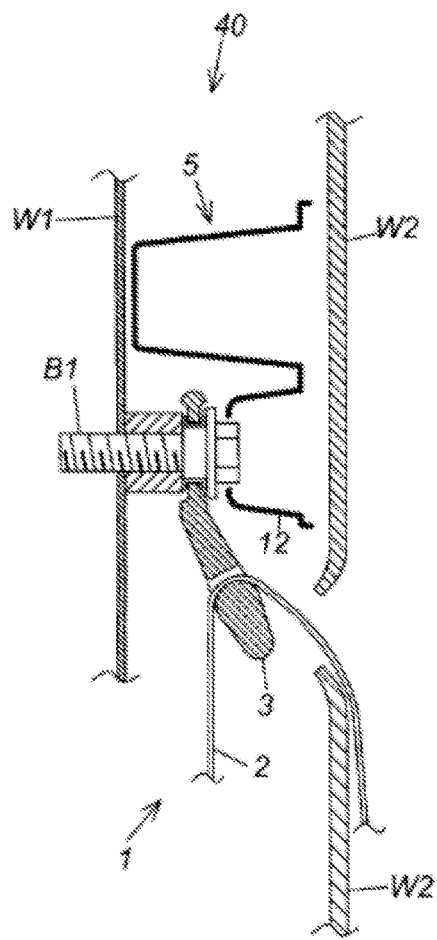
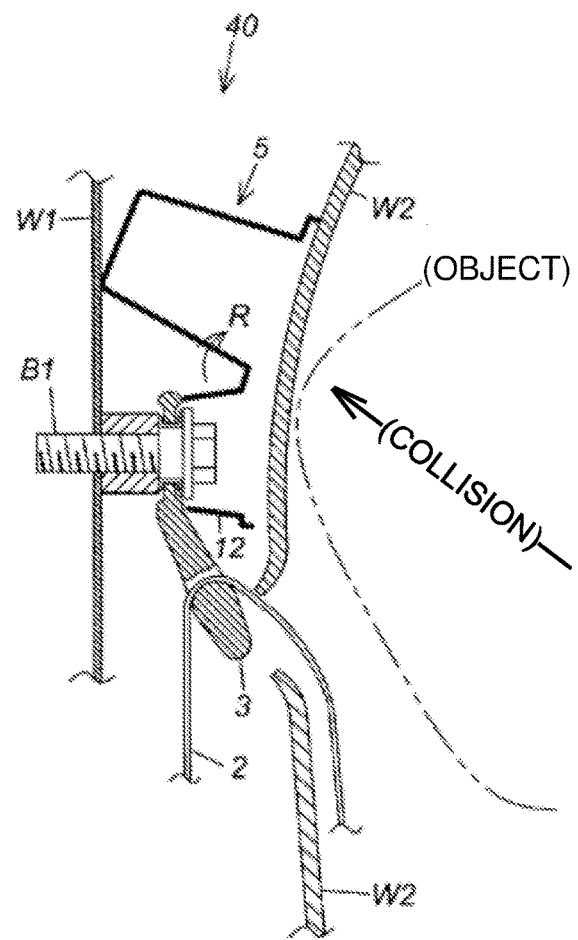

STRUCTURE FOR ABSORBING IMPACT NEAR SEAT BELT ANCHOR BOLT

CROSS-REFERENCE TO RELATED APPLICATIONS

This application is a National Stage Entry application of PCT International Application No. PCT/JP2015/060063, filed on Mar. 31, 2015, which claims the priority benefit of Japanese Patent Application No. 2014-173599, filed on Aug. 28, 2014, the entire contents of both of which are hereby incorporated by reference.

BACKGROUND

1. Technical Field

The present invention relates to a structure for absorbing an impact applied from the inside or outside of a vehicle near a seat belt anchor bolt by which a trough ring (unit for hanging a seat belt by causing the seat belt to pass therethrough) is attached to a vehicle body panel.

2. Description of the Background

Conventionally, there has been adopted an impact absorbing structure, for example, as disclosed in Patent Literature 1, near a seat belt anchor bolt for absorbing an impact applied from the inside of a vehicle via a vehicle interior component or an impact applied from the outside of the vehicle via a vehicle body panel.

Specifically, in the impact absorbing structure of Japanese Patent Application Laid-open 2009-220713 (hereinafter referred to as "Patent Literature 1"), in the vicinity of a seat belt anchor bolt (22), impact absorbing ribs (57a, 57b) are arranged on a back face of a vehicle interior component (7). Ends of the impact absorbing ribs (57a, 57b) faces to a head part of the seat belt anchor bolt (22).

In the impact absorbing structure of Patent Literature 1, in the vicinity of the seat belt anchor bolt (22), when an impact is applied from the inside of the vehicle via the vehicle interior component (7) or when an impact is applied from the outside of the vehicle via the vehicle body panel (5), the applied impact is to be absorbed while the head part of the seat belt anchor bolt (22) crushes the impact absorbing ribs (57a, 57b). Accordingly, in a case that clearance between the head part of the seat belt anchor bolt (22) and the impact absorbing ribs (57a, 57b) is not sufficient, there is a problem that sufficient impact absorbing effect cannot be obtained because the impact absorbing ribs is crushed in a relatively early stage after the impact occurs.

In the above description, reference signs in Patent Literature 1 are shown in parentheses.

Being different from the impact absorbing structure in Patent Literature 1, for example, an impact absorbing structure 40 illustrated in FIG. 3A may be considered as a structure for absorbing an impact near a seat belt anchor bolt.

The impact absorbing structure 40 in FIG. 3A is located between a vehicle body panel W1 and a vehicle interior component W2. In the vicinity of a seat belt anchor bolt B1, when an impact is applied from the inside of a vehicle via the vehicle interior component W2 or when an impact is applied from the outside of the vehicle via the vehicle body panel W1, the impact absorbing structure 40 absorbs the impact by causing an impact absorbing box 5 to be crushed.

However, according to the impact absorbing structure 40 in FIG. 3A, when an impact is applied to the impact absorbing box 5 via the vehicle interior component W2, for example, from a lower oblique direction of the impact absorbing box 5 (in the direction of arrow R in FIG. 3B), the impact absorbing box 5 is tilted in a direction to escape from the seat belt anchor bolt B1 as illustrated in FIG. 3B, that is, an escaping-slipping phenomenon due to tilting of the impact absorbing box 5 occurs.

Thus, crushing of the impact absorbing box 5 is unstable such that the impact absorbing box 5 is not crushed as designed, so that impact absorption effects are fluctuating and unstable.

BRIEF SUMMARY

To solve the abovementioned problem, an object of the present invention is to provide an impact absorbing structure near a seat belt anchor bolt suitable for obtaining unfluctuating and stable impact absorption effects with stable crushing of an impact absorbing box.

To achieve the abovementioned object, the present invention provides an impact absorbing structure is located between a vehicle body panel and a vehicle interior component to absorb an impact applied from outside or inside of a vehicle near a seat belt anchor bolt that protrudes from the vehicle body panel toward the inside of the vehicle. The impact absorbing structure includes a cylinder body that accommodates a head part of the seat belt anchor bolt; an impact absorbing box that is arranged adjacently to the cylinder body, the impact absorbing box including a top plate facing the vehicle body panel; a base that supports the impact absorbing box; an attaching unit that attaches the base to a back face of the vehicle interior component; a stepped portion that is arranged on a side face of the impact absorbing box as a base point of crush deformation of the impact absorbing box; and a rib that is arranged between the impact absorbing box and the cylinder body, the rib configured to prevent escape of the impact absorbing box due to tilting thereof.

In the present invention, the rib may have a divergent shape as being spread from the vicinity of the stepped portion toward the vicinity of a bottom part of the impact absorbing box.

In the present invention, a bottom part of the cylinder body and a bottom part of the rib may be integrated by being connected with a connecting rib.

In the impact absorbing structure near a seat belt anchor bolt of the present invention, in addition to arrange the impact absorbing box as a member to actually absorb an impact, a stepped portion is arranged on a side face of the impact absorbing box as a base point of crush deformation of the impact absorbing box, and a rib is arranged between the impact absorbing box and the cylinder body to prevent escape of the impact absorbing box due to tilting thereof. Accordingly, effects described below are obtained.

Effect 1

In the vicinity of a seat belt anchor bolt, there are variations in directions in which impacts are applied from the inside of a vehicle via a vehicle interior component or in which impacts are applied from the outside of the vehicle via a vehicle body panel. That is, impacts are not always applied from the same direction. According to the present invention, even when a direction of an impact varies, the impact absorbing box is to be crushed surely in the same direction since the impact absorbing box is to be crushed with the stepped portion on the side face being a base point. That is, crushing of the impact absorbing box is stable. Thus, the present invention can provide the impact absorbing structure near a seat belt anchor bolt suitable for obtaining unfluctuating and stable impact absorbing effects.

Effect 2

In particular, according to the present invention, when the impact absorbing box is to be tilted by an impact in a direction to escape from the seat belt anchor bolt, holding action to prevent the tilting is exerted by the rib being pulled in the tilting direction. Accordingly, the tilting of the impact absorbing box can be effectively suppressed. Thus, it is also possible to obtain an effect that crushing of the impact absorbing box becomes more stable such that the impact absorbing box is crushed as designed.

Effect 3

Since an impact is absorbed by the impact absorbing box instead of a conventional cross-shaped rib, the present invention can provide the impact absorbing structure having an increased absorption amount of impact energy as being suitable for satisfying a necessary impact energy absorption amount.

BRIEF DESCRIPTION OF DRAWINGS

FIG. 2A is a side view of the impact absorbing structure in FIG. 1.

FIG. 2B is a plane view viewing in a direction of arrow A in FIG. 2A.

FIG. 3A is a sectional view of a conventional impact absorbing structure near a seat belt anchor bolt.

FIG. 3B is an operational explanatory view thereof.

DETAILED DESCRIPTION

Figure 1:
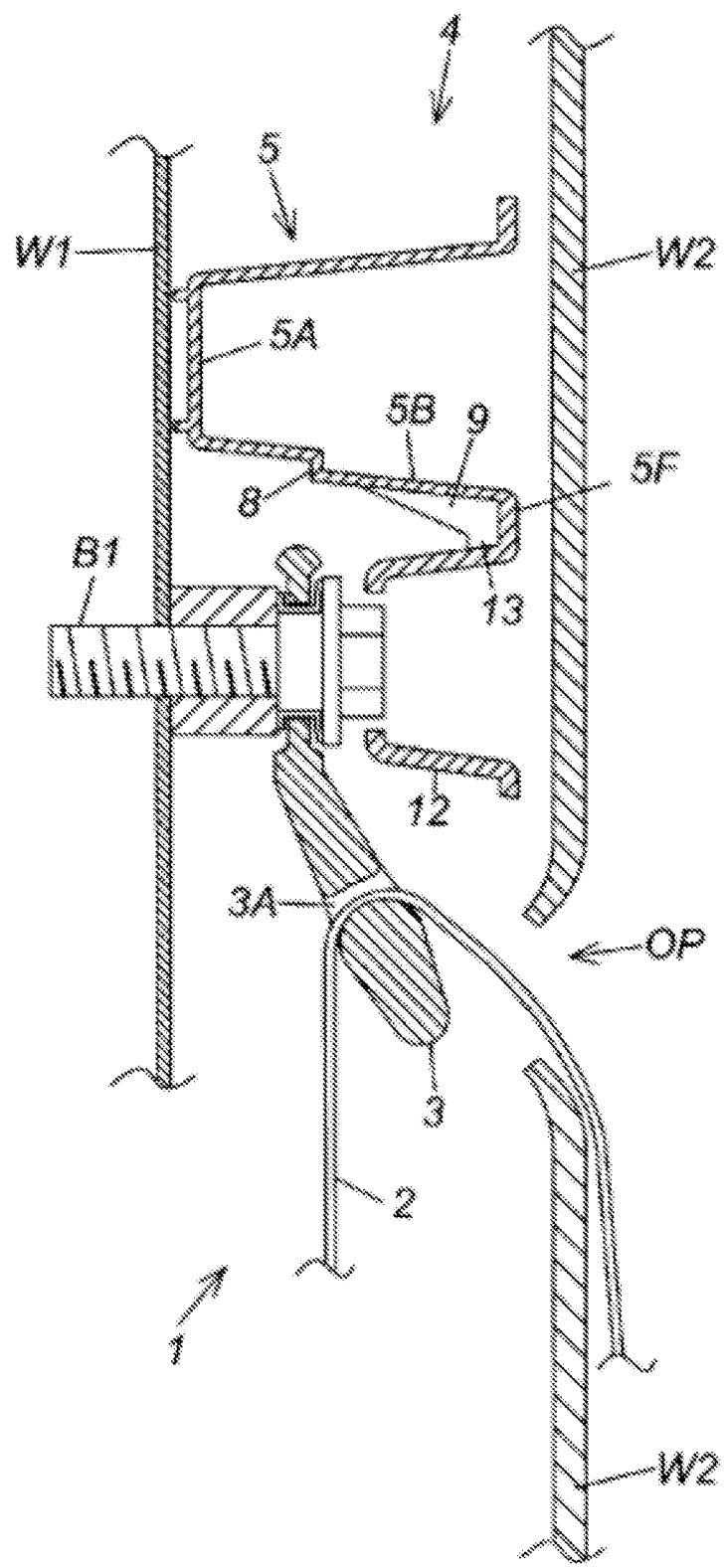
FIG. 1 is a sectional view of a seat belt apparatus to which an impact absorbing structure near a seat belt anchor bolt according to the present invention is applied.

In the following, preferable embodiments of the present invention will be explained with reference to the attached drawings.

FIG. 1 is a sectional view of a seat belt apparatus to which an impact absorbing structure near a seat belt anchor bolt according to the present invention is applied. FIG. 2A is a side view of the impact absorbing structure in FIG. 1. FIG. 2B is a plane view viewing in a direction of arrow A in FIG. 2A.

General Description of Seat Belt Apparatus

A seat belt apparatus 1 in FIG. 1 includes a seat belt 2 unreeled from a seat belt unreeling-reeling device (not illustrated) between a metal-made vehicle body panel W1 and a resin-made vehicle interior component (e.g., rear side pillar) W2 attached thereto having a predetermined gap thereto. A leading end part (not illustrated) of the seat belt 2 is exposed to the inside of a vehicle through an opening OP (see FIG. 2B) of the vehicle interior component W2 after passing through an insertion hole 3A of a through-ring 3.

The through-ring 3 is attached directly to the vehicle body panel W 1. The through-ring 3 is swingable to each side about a seat belt anchor bolt B1.

Description of Impact Absorbing Structure Near Seat Belt Anchor Bolt

The seat belt anchor bolt B1 is a protruding object (vehicle body panel protruding object) protruding from the vehicle body panel W1 toward the inside of the vehicle. An impact absorbing structure 4 near the seat belt anchor bolt B1 is located between the vehicle body panel W1 and the vehicle interior component W2 as illustrated in FIG. 1. The impact absorbing structure 4 absorbs an impact applied to the vicinity of the seat anchor bolt B1 from the outside or inside of the vehicle.

Specifically, the impact absorbing structure 4 includes a cylinder body 12 that accommodates a head part of the seat belt anchor bolt B1, an impact absorbing box 5 that is arranged adjacently to the cylinder body 12 and that includes a top plate 5A facing the vehicle body panel W1, a base 6 that supports the impact absorbing box 5, and an attaching unit 7 that attaches the base 6 to a back face of the vehicle interior component W1.

The impact absorbing box 5 includes four side plates 5B, 5C, 5D, 5E integrally formed at edge parts of the top plate 5A to be into a trapezoidal shape in side view.

Further, the impact absorbing structure 4 in FIG. 1 includes a stepped portion 8 having a stepped shape of one step that is arranged on a side face (specifically, on an outer face of the side plate 5B) of the impact absorbing box 5 as a base point of crush deformation of the impact absorbing box 5.

In the impact absorbing structure 4 in FIG. 1, the stepped portion 6 is arranged at the side plate 5B facing the seat belt anchor bolt B1 among the four side plates 5B to 5E so that the impact absorbing box 5 is to be crushed by an impact from the inside or outside of the vehicle as buckling to bow in a direction toward the seat belt anchor bolt B1. However, location of the stepped portion 8 is not limited thereto.

For example, the stepped portion 8 may be arranged at any of the side plates 5C to 5E other than the side plate 5B so that the impact absorbing box 5 is to be crushed as buckling in any direction other than a direction toward the seat belt anchor bolt B1. Further, two or more of the stepped portions 8 may be arranged at a single side plate among the four side plates 5B to 5E. Further, one or a plurality of stepped portions 8 may be arranged at each of two or more of the side plates among the four side plates 5B to 5E.

Further, the impact absorbing structure 4 in FIG. 1 includes a rib 9 that is arranged between the impact absorbing box 5 and the cylinder body 12. The impact absorbing structure 4 prevents escape of the impact absorbing box 5 due to tilting thereof.

The inventor confirmed occurrence of the escaping-slipping phenomenon due to tilting of the impact absorbing box 5 in the impact absorbing structure 40 illustrated in FIG. 3A. That is, when an impact is applied to the impact absorbing box 5 via the vehicle interior component W2, for example, from a lower oblique direction of the impact absorbing box 5 (in the direction of arrow R in FIG. 3B), the impact absorbing box 5 is tilted in a direction to escape from the seat belt anchor bolt B1 without being crushed as designed.

In contrast, according to the impact absorbing structure 4 illustrated in FIG. 1, when the impact absorbing box 5 is to be tilted as described above, the rib 9 arranged between the impact absorbing box 5 and the cylinder body 12 exerts holding action to prevent the tilting by being pulled in the tilting direction. Accordingly, the tilting of the impact absorbing box 5 can be effectively suppressed, so that the impact absorbing structure 4 is preferable in that the impact absorbing box 5 is to be crushed as designed.

In the impact absorbing structure 4 in FIG. 1, as a specific shape of the rib 9, the rib 9 has a divergent shape as being spread from the vicinity of the stepped portion 8 toward the vicinity of a bottom part of the impact absorbing box 5. Since the impact absorbing box 5 is to be tilted as having the vicinity of the bottom part 5F as a base point, the divergent shape is adopted to enhance the holding action to prevent the tilting in the vicinity of the bottom part 5F of the impact absorbing box 5. Here, the divergent shape is not limited to a triangular shape as the rib 9 illustrated in FIG. 1.

Further, in the impact absorbing structure 4 in FIG. 1, a connecting rib 13 integrates a bottom part of the cylinder body 12 with a bottom part of the rib 9 to enhance the holding action to prevent the tilting. Here, the cylinder body 12 may have a polygonal cross-section (i.e., polygonal cylinder) or a circular cross-section (i.e., circular cylinder).

The impact absorbing structure 4 in FIG. 1 includes two ribs 9 (see FIG. 2A). However, the number thereof can be appropriately changed as needed.

The base 6 to support the impact absorbing box 5 is arranged below the impact absorbing box 5. In the impact absorbing structure 4 in FIG. 1, the base 6 and the impact absorbing box 5 are integrally formed of resin. However, it is also possible that those are formed separately and assembled thereafter.

Referring to FIGS. 2A and 2B, the attaching unit 7 is configured to position and attach the base 6 on the back face of the vehicle interior component W1 owing to fitting a protrusion 10 protruding from the back face of the vehicle interior component W1 into a fitting hole 11 formed at the base 6. However, another configuration may be adopted.

According to the impact absorbing structure 4 of the present embodiment as described above, in the vicinity of the seat belt anchor bolt B1, even when a direction of an impact applied from the inside of the vehicle via the vehicle interior component W2 or a direction of an impact applied from the outside of the vehicle via the vehicle body panel W1 varies, the impact absorbing box 5 is to be crushed surely in the same direction since the impact absorbing box 5 is to be crushed with the stepped portion 8 on the side face being a base point. That is, it is possible to obtain unfluctuating and stable impact absorbing effects with stable crushing of the impact absorbing box 5.

In particular, according to the impact absorbing structure 4 of the present embodiment, when the impact absorbing box 5 is to be tilted by an impact in a direction to escape from the seat belt anchor bolt B1, holding action to prevent the tilting is exerted by the rib 9 being pulled in the tilting direction. Accordingly, the tilting of the impact absorbing box 5 can be effectively suppressed. Thus, crushing of the impact absorbing box 5 becomes more stable such that the impact absorbing box 5 is crushed as designed.

Not limited to the embodiments described above, the present invention may be modified variously by a person skilled in the art within the technical scope of the present invention.

REFERENCE SIGNS LIST

1: Seat belt apparatus
2: Seat belt
3: Through-ring
3A: Insertion hole
4: Impact absorbing structure
5: Impact absorbing box
5A: Top plate
5B, 5C, 5D, 5E: Side plate
5F: Bottom part
6: Base
7: Attaching unit
8 Stepped portion
9: Rib
10: Protrusion
11: Fitting hole
12: Cylinder body
13: Connecting rib
B1: Seat belt anchor bolt (Vehicle body panel protruding object)
OP: Opening
W1: Vehicle body panel
W2: Vehicle interior component

The invention claimed is:

1. An impact absorbing structure located between a vehicle body panel and a vehicle interior component, the impact absorbing structure attached to a seat belt anchor bolt that protrudes from the vehicle body panel toward the vehicle interior component, the impact absorbing structure comprising:
   a cylinder body that accommodates a head part of the seat belt anchor bolt;
   an impact absorbing box that is arranged adjacently to the cylinder body, the impact absorbing box including a top plate facing the vehicle body panel and a side face having a stepped portion;
   a base that supports the impact absorbing box;
   an attaching unit that attaches the base to the vehicle interior component; and
   a rib that is arranged between the impact absorbing box and the cylinder body.

2. The impact absorbing structure according to claim 1, wherein the rib has a divergent shape as being spread from the stepped portion toward the base.

3. The impact absorbing structure according to claim 1, further comprising a connecting rib that connects the cylinder body and the rib.

4. The impact absorbing structure according to claim 1, wherein the impact absorbing box is deformed as having the stepped portion as a base point.

5. The impact absorbing structure according to claim 1, wherein the rib prevents escape of the impact absorbing box due to tilting thereof.

6. The impact absorbing structure according to claim 1, wherein a side face having the stepped portion faces the cylinder body.

7. The impact absorbing structure according to claim 2, further comprising a connecting rib that connects the cylinder body and the rib.

8. The impact absorbing structure according to claim 2, wherein the impact absorbing box is deformed as having the stepped portion as a base point.

9. The impact absorbing structure according to claim 3, wherein the impact absorbing box is deformed as having the stepped portion as a base point.

10. The impact absorbing structure according to claim 2, wherein the rib prevents escape of the impact absorbing box due to tilting thereof.

11. The impact absorbing structure according to claim 3, wherein the rib prevents escape of the impact absorbing box due to tilting thereof.

12. The impact absorbing structure according to claim 4, wherein the rib prevents escape of the impact absorbing box due to tilting thereof.

13. The impact absorbing structure according to claim 2, wherein a side face having the stepped portion faces the cylinder body.

14. The impact absorbing structure according to claim 3, wherein a side face having the stepped portion faces the cylinder body.

15. The impact absorbing structure according to claim 4, wherein a side face having the stepped portion faces the cylinder body.

16. The impact absorbing structure according to claim 5, wherein a side face having the stepped portion faces the cylinder body.

\* \* \* \* \*